Feb. 26, 1963   C. B. KELLING   3,078,952
VEHICLE WHEEL STEP
Filed April 20, 1961   2 Sheets-Sheet 1
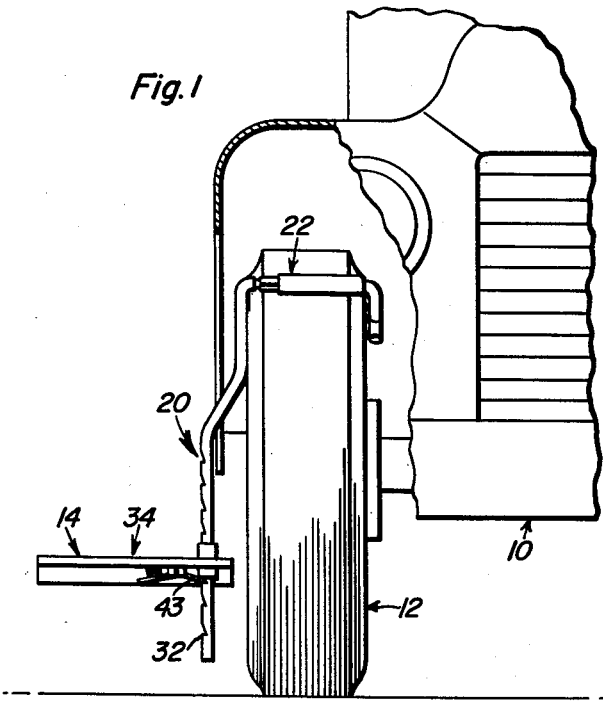
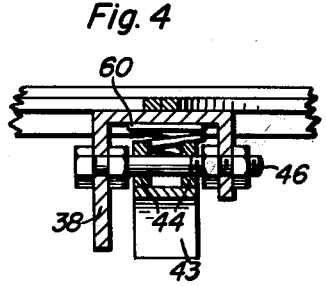
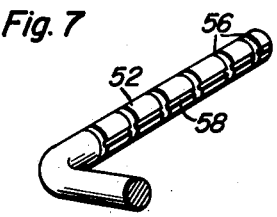
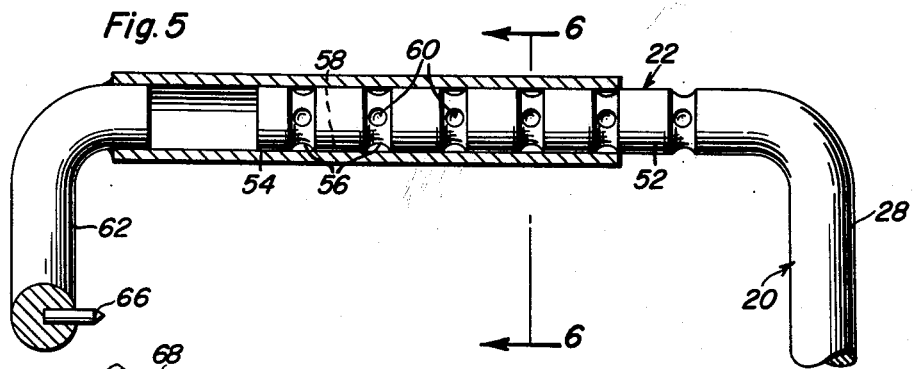
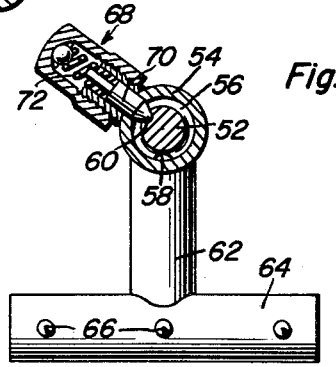
Charles B. Kelling
INVENTOR.

Feb. 26, 1963　　　C. B. KELLING　　　3,078,952
VEHICLE WHEEL STEP
Filed April 20, 1961　　　　　　　　　　　　　　2 Sheets-Sheet 2
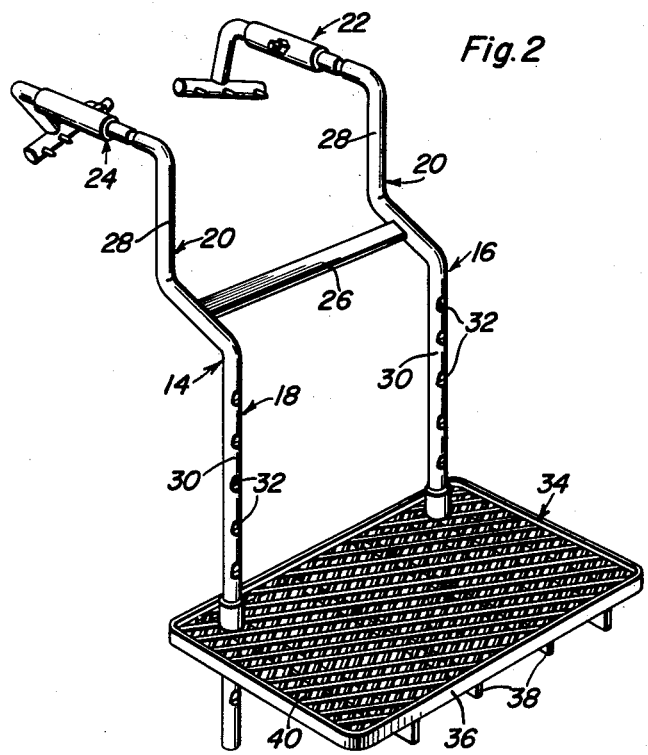
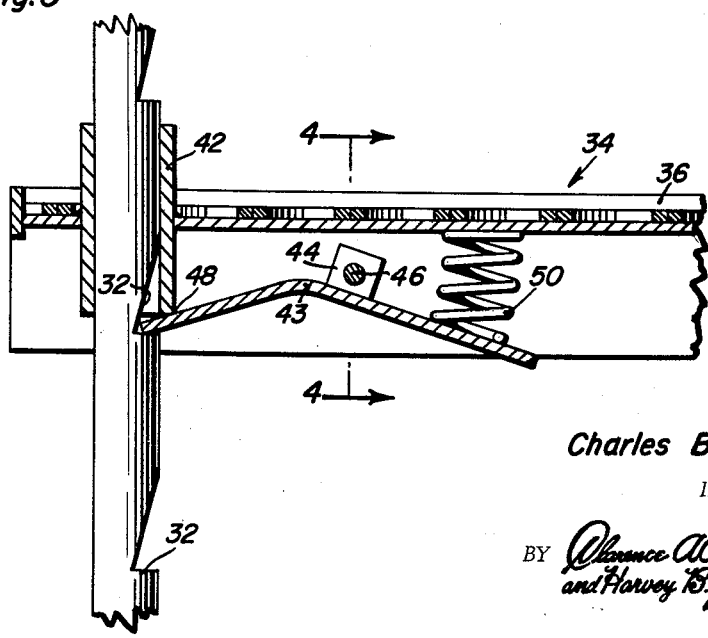
Charles B. Kelling
INVENTOR.

United States Patent Office 3,078,952
Patented Feb. 26, 1963

3,078,952
VEHICLE WHEEL STEP
Charles B. Kelling, Worland, Wyo., assignor of ten percent to J. R. McKibbin, Worland, Wyo.
Filed Apr. 20, 1961, Ser. No. 104,341
1 Claim. (Cl. 182—150)

This invention relates to a novel and useful vehicle wheel step and more specifically to a vehicle wheel step adapted to support a mechanic alongside a vehicle wheel and above the supporting surface for the vehicle wheel.

The step includes a pair of generally L-shaped support members which each include an upstanding leg portion adapted to extend alongside of an upright vehicle wheel and a generally horizontal upper leg adapted to overlie the upper tread surface of a vehicle wheel. A step member is secured between the lower ends of the upstanding leg portions and is slidable longitudinally of the upstanding leg portions. The leg portions are provided with outwardly and upwardly opening notches and the step is provided with latch means releasably engageable with selected notches for releasably retaining the step in selected elevated positions relative to the upstanding leg portions. The horizontal leg portions each terminate at their free ends in a downturned end portion adapted to frictionally grip the upper surfaces of the side of a vehicle wheel remote from the side of the wheel along which the upstanding leg portions extend. The horizontal legs are each extensible and include means for releasably retaining the extensible horizontal legs in adjusted extended positions whereby the distance between the upstanding leg portions and the downturned end portions may be selectively varied in order to adapt the vehicle wheel step to fit vehicle wheels of varying thickness. Additionally, when the vehicle wheel step is secured to a vehicle wheel, the extensible horizontal leg portions are adjusted in order that the upper portion of the vehicle wheel may be clampingly engaged between the upstanding leg portions and the downturned end portions. In this manner, the vehicle wheel step is rigidly secured to a vehicle wheel and it may be readily adjusted for rigid securement to vehicle wheels of varying thickness.

The main object of this invention is to provide an improved vehicle wheel step which will support a mechanic alongside a vehicle wheel and above the supporting surface for the vehicle wheel.

A further object of this invention, in accordance with the immediately preceding object is to provide a vehicle wheel step which may be rigidly secured to a vehicle wheel in order that the step will provide a stationary support for the mechanic using the step.

Still another object of this invention is to provide a vehicle wheel step provided with a step platform and constructed in a manner whereby the step platform may be supported in a position spaced laterally from the side of the vehicle wheel to which the vehicle wheel step is secured.

A final object to be specifically enumerated herein is to provide a vehicle wheel step which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an end elevational view of the vehicle wheel step of the instant invention showing the manner in which the vehicle wheel step may be clampingly secured to a vehicle wheel, parts of the vehicle being broken away and shown in section;

FIGURE 2 is a somewhat enlarged perspective view of the vehicle wheel step;

FIGURE 3 is an enlarged fragmentary vertical sectional view taken through a portion of the step member of the vehicle wheel step and showing the manner in which the step member may be positioned longitudinally of the support members therefor;

FIGURE 4 is a fragmentary vertical sectional view taken substantially upon the plane indicated by the section line 4—4 of FIGURE 3;

FIGURE 5 is a fragmentary vertical sectional view showing the manner in which the portion of the vehicle wheel step adapted to be disposed over the upper surfaces of a vehicle wheel may be extended and retained in adjusted extended positions;

FIGURE 6 is a vertical sectional view taken substantially upon the plane indicated by the section line 6—6 of FIGURE 5;

FIGURE 7 is a fragmentary perspective view of a portion of one of the support members adapted to be positioned over the upper surfaces of a vehicle wheel.

Referring now more specifically to the drawings there will be seen in FIGURE 1 a vehicle generally referred to by the reference numeral 10 which is provided with a tire-equipped support wheel generally referred to by the reference numeral 12. The vehicle wheel step of the instant invention is referred to in general by the reference numeral 14.

From FIGURE 2 of the drawings it may be seen that the vehicle wheel step 14 comprises a pair of substantially identical inverted hooks or generally L-shaped support members 16 and 18. The support members 16 and 18 each include an upstanding leg portion generally referred to by the reference numeral 20 and a horizontal leg portion generally referred to by the reference numeral 22. The support members 16 and 18 are rigidly interconnected by means of a brace 26 and each includes an upper portion 28 and a laterally offset lower portion or shank 30 whose outer surfaces are provided with upwardly and outwardly opening notches 32.

A step member or platform generally referred to by the reference numeral 34 includes a generally rectangular frame 36 including supplemental transverse brace members 38 in the form of inverted channel bars. An expanded metal support surface or tread panel 40 is secured in the frame 36 on the transverse brace members 38. The step member 34 further includes a pair of sleeves 42 on the members 38 which project above and below the expanded metal support 40 and slidably receive the lower portions 30 of the support members 14 and 16. The step member 34 also includes a pair of pawls or latch levers 43 which are pivotally secured in the members 38 by means of apertured mounting lugs 44 which rotatably receive a pivot pin 46. One end of the lever 43 is engageable with the corresponding notches 32 and the lower end of the corresponding sleeve 42 as at 48. The other end of each of the latch levers 43 has a compression spring 50 disposed between the frame 36 and that end of the lever 43 to yieldably urge the lever 43 toward a position with the end thereof remote from the spring 50 engaged with one of the notches 32 and the lower end of the corresponding sleeve 42. In this manner, it may be noted that the levers 43 may be utilized to releasably retain the step member 34 in selected elevated positions relative to the support members 14 and 16.

With attention now directed to FIGURES 5 through 7 of the drawings it will be noted that each of the horizontal leg portions 22 and 24 includes a pair of telescoped members 52 and 54. The member 52 comprises a laterally directed end portion of the upper portion 28 and is provided with a plurality of circumferential notches or grooves 56 which are spaced longitudinally of the section 52 and are communicated by means of a longitudinal groove 58. It will further be noted that each of the circumferential grooves 56 includes a recess 60 which opens radially and outwardly of the section 52 The section 52 is rod-like and is slidably and rotatably received within the tubular section 54 whose end remote from the section 52 terminates in a downturned generally T-shaped member or end portion 62. The downturned end portion 62 terminates at its free end in a laterally enlarged head portion 64 including a plurality of laterally directed gripping elements 66 which project toward the corresponding upper portion 28. The gripping elements are adapted to frictionally engage the upper surfaces of the inside of the wheel 12. Each of the tubular sections 54 includes a detent assembly generally referred to by the reference numeral 68 which includes a detent member 70 that is yieldably urged radially inwardly of the tubular section 54 by means of compression spring 72. When it is desired to extend the horizontal leg portion 22 the tubular section 54 is rotated in order to register the detent member 70 with the longitudinal groove 58 whereupon the telescoped sections 52 and 54 may be extended. Then, as the desired length of the horizontal leg 22 is achieved, the detent member 70 may be registered with the closest circumferential groove 56 and the tubular section 54 may be rotated to the position illustrated in FIGURES 5 and 6 of the drawings to engage the detent member with the corresponding recess 60.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A vehicle wheel step for supporting a mechanic alongside a vehicle wheel and above the supporting surface for said wheel, said step comprising a pair of generally inverted L-shaped support members each including a leg portion adapted to extend along the side of an upright wheel and a generally horizontal upper leg portion adapted to overlie the upper tread surface of said vehicle wheel, a step member secured between the lower ends of said upstanding leg portion and extending laterally outwardly from the latter, each of said horizontal legs including a downturned end portion on its free end adapted to frictionally grip the upper portion on the side of said vehicle tire remote from said upstanding leg portions, said horizontal leg portions each comprising partially telescopingly engaged rod-like and tubular members, the remote ends of each set of telescopingly engaged rod-like and tubular members being fixedly secured to the upper ends of the corresponding legs and downturned end portions respectively, said rod-like members each having longitudinally spaced circumferential grooves formed therein, each of said circumferential grooves having circumferentially spaced outwardly opening recesses formed therein, and means including a spring-biased detent on each of said tubular members engageable selectively in the grooves and recesses formed in the corresponding rod-like member for securing each of said rod-like members in adjusted rotated and longitudinally shifted positions relative to the corresponding tubular member, each of said rod-like members also having a longitudinal groove formed therein communicating the circumferential grooves for the passage of the detent therebetween.

References Cited in the file of this patent
UNITED STATES PATENTS

| | | |
|---|---|---|
| 77,733 | Holzer | May 12, 1868 |
| 459,247 | Biddall | Sept. 8, 1891 |
| 671,395 | Hayward | Apr. 2, 1901 |
| 937,480 | O'Brien | Oct. 19, 1909 |
| 1,119,734 | Van Giesen | Dec. 1, 1914 |
| 1,707,894 | Bergesen | Apr. 2, 1929 |
| 2,843,393 | Dahlander | July 15, 1958 |
| 2,854,292 | Schaeffer | Sept. 30, 1958 |
| 2,973,052 | Miller | Feb. 28, 1961 |